United States Patent [19]

Haubs et al.

[11] Patent Number: 5,156,888
[45] Date of Patent: Oct. 20, 1992

[54] METHOD AND APPARATUS FOR APPLYING POLYMERIC COATING

[75] Inventors: Michael Haubs, Chatham; Walt Hassinger, Anandale, both of N.J.

[73] Assignee: Hoechst Celanese Corp., Somerville, N.J.

[21] Appl. No.: 582,691

[22] Filed: Sep. 14, 1990

[51] Int. Cl.$^5$ .............................................. B05D 3/06
[52] U.S. Cl. .................................. 427/163; 118/405; 118/420; 118/DIG. 19; 427/164; 427/389.9; 427/393.5; 427/434.3; 427/434.5; 427/434.7
[58] Field of Search ................ 427/163, 434.3, 434.5, 427/434.7, 38.97, 164, 393.5; 118/405, 420, DIG. 19

[56] References Cited

U.S. PATENT DOCUMENTS

| | | | |
|---|---|---|---|
| 2,456,650 | 12/1948 | Ryan | 427/434.7 |
| 3,899,313 | 8/1975 | Grabmaier | 427/434.3 |
| 4,439,467 | 3/1984 | Kassahun | 427/434.7 |
| 4,704,307 | 11/1987 | Jochem et al. | 427/434.7 |
| 4,783,348 | 11/1988 | Arbrecht et al. | 427/434.3 |

Primary Examiner—Janyce Bell
Attorney, Agent, or Firm—M. W. Ferrell

[57] ABSTRACT

A method for applying polymeric coatings to fibers is disclosed and claimed. The method involves solution casting a film atop a liquid bath and radially advancing the pre-cast film to a central point where the fiber to be coated is drawn through the film so that a uniform coating is applied about the entire circumference of the fiber. The polymeric film is maintained in a swollen state to ease processing and promote adhesion.

21 Claims, 1 Drawing Sheet

METHOD AND APPARATUS FOR APPLYING POLYMERIC COATING

FIELD OF INVENTION

The present invention relates generally to applying polymeric coatings to fibers and more particularly to coating fibers with an ultrathin polymer layer.

BACKGROUND ART

It is known in the art to prepare free standing, pinhole-free ultrathin films suitable for separatory applications. In U.S. Pat. No. 4,880,699 to Kohn there is disclosed and claimed, for example, a method of preparing thin polyimide films. Such films are prepared by dissolving the polymer in a solvent, casting the solution on water, and evaporating the solvent. The film so formed can then be readily removed from the water's surface.

A free standing film fabricated in accordance with the foregoing may be difficult to incorporate into commercially attractive structures, for example, into a hollow fiber membrane module useful for gas separation. One alternative approach might be to dip-coat hollow microporous fibers. Such a method, however, would undoubtedly have the disadvantage that the polymer solution would penetrate the microporous structure due to the wicking effect, leading to non-uniform thicknesses of the coating. Another possibility for applying thin, continuous cast membranes to a hollow fiber would be mechanical wrapping. This method is arduous at best, and coating thicknesses and film quality would largely be determined in the casting step. 0 In Japanese laid-open application No. 63-104618 of Kawada et al. there is disclosed a method of producing hollow fiber composite membranes. The method shown involves continuously casting a thin film on water and passing a microporous hollow fiber through the polymer solution in a region where the polymer/solvent solution possesses fluidity. The solution deposits a thin film on the membrane while excess polymer is taken up and stored. The system utilized by Kawada et al. does not address the issues of depositing a thin film uniformly about the periphery of a hollow fiber as would be required for high quality separation membranes. Moreover, significant control and recycling of polymer would be required, making the system difficult to automate or even produce commercially suitable product.

SUMMARY OF INVENTION

In accordance with the present invention, fibers are coated by providing a polymer solution to the surface of a liquid bath to form a polymeric layer on the surface of the bath thereby creating a film, and drawing a fiber therethrough. The polymer solution is radially advanced to a central point where the fiber is drawn through the film so that there is deposited a film of uniform thickness on the fiber about its entire periphery. In a preferred embodiment, the polymer is supplied at a rate and in amounts such that all of the polymer supplied to the bath is deposited on the fiber, while the solvent is partially evaporated. The inventive method is particularly useful for coating hollow microporous fibers for making composite gas separation membranes where repeated coatings may be required. The pre-cast film does not penetrate the pores and thus films of predetermined and uniform thickness may be achieved.

BRIEF DESCRIPTION OF DRAWING

The invention is described in detail below with reference to the single figure which is a schematic view in elevation and section of an apparatus used in connection with the process of the present invention.

DETAILED DESCRIPTION

Figure 1:
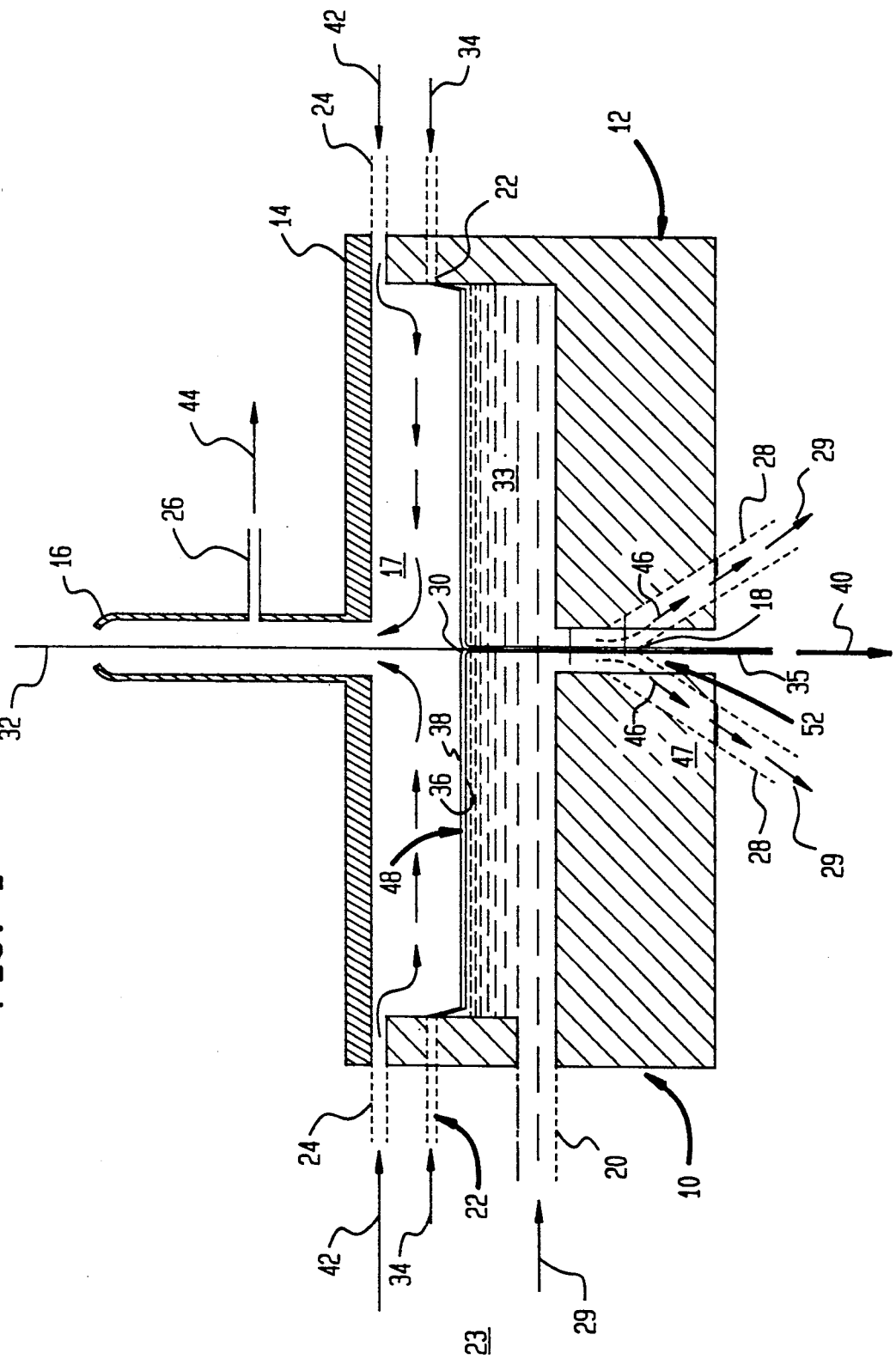

The present invention will now be described with reference to a specific embodiment involving coating a polypropylene fiber with a polyimide polymer coat or layer. It is to be understood, however, that such description is for purposes of exposition and not for purposes of limitation. It will be readily understood that the inventive concept is equally applicable to other systems, such as applying multiple coatings to a polymethacrylate fiber to produce a graded index optical fiber, or to applying coating to polyester, polyolefin fibers or the like consisting of any polymer capable of forming a film atop a bath.

An apparatus 10, schematically depicted in FIG. 1, is an apparatus for continuously coating a fiber with a pre-formed film. Apparatus 10 includes a feed roll (not shown) a cylindrical bath container 12 provided with a top portion 14 to define interior plenum chamber 17. There is a fiber inlet 16 at the top and an exit hole 18 below the bath. A fiber 32 enters at 16 and exits hole 18 and is conveyed to a drying area (not shown). Typically, the coated fiber is dried to remove residual solvent as well as drive off any liquid from the bath.

Bath container 12 is conveniently provided with a bath liquid inlet 20, and a polymer feed port 22, preferably there are four such ports spaced equally about the periphery of the bath to ensure good distribution of polymer solution about the circumference of the bath. Polymer is fed from a reservoir indicated at 23. To achieve desired feed rates it is convenient to use a mechanized syringe-type feeder. There is additionally provided a nitrogen gas inlet 24 and a gas outlet 26.

In operation a polymer solution is prepared and fed from one or more reservoirs 23 through one or more feed ports 22 onto a surface 36 of a bath 33 as shown in the direction indicated by arrows 34. While any suitable materials may be used, preferred polymers for coatings include polyimides, polyesters, polysulfones, polyetherketones, polycarbonates, polyolefins, polyamides and the like and the fibers to be coated may be the same or a different material. Glassy polyimides and the like are particularly preferred. A variety of organic solvents may be used and it is useful to use a surface active agent in the polymeric solution for purposes of continuous casting and coating. Such agents may be of the various known surfactant types, of the anionic, cationic, polyoxyethylene, semipolar, or zwitterionic class for example, including such compounds as sodium dodecyl sulfate, trimethyl dodecyl ammonium chloride, a condensation product of 1 mole dodecyl alcohol with 10 moles of ethylene oxide, dimethyl dodecyl amine oxide, dimethyl dodecyl ammonium propionate or like compounds. Surface active agents of the polysiloxane type or those with a perfluorinated hydrophobic portion are particularly preferred.

Apparatus 10 may be operated with various feed rates of polymer generally in the range of about 0.05 to about 20 microliters per second; 0.2 to about 3 microliters per second being preferred. The solution employed may be of any suitable concentration such that a film 38 remains in a swollen, low viscosity state as further discussed herein. Generally, this is achieved by using a solution generally of about 0.1 to about 30 weight per cent polymer and typically of from about 1 to about 10 weight per cent polymer at the inception of the process and allowing a partial evaporation of the solvent before the polymeric layer contacts the fiber to be coated. It is important to maintain the polymeric layer in a low viscosity, highly flexible state when it contacts the fiber, but not so dilute that it will wick into the micropores which leads to non uniform thickness. Preferred concentrations at the inception of the process are from about 2 to 4 weight per cent polymer and most preferably from about 2.5 to about 3.5 weight per cent polymer.

While film 38 is forming on the bath, liquid flow is initiated, originating at 20 and exiting apparatus 10 at 28 after flowing through a separator portion 46 of a conical area 47 which also defines central hole 18. Flow direction is indicated by arrows 29. Liquid flow may or may not be required for a given system and may be adjusted by a valve or any suitable means to adjust a vortex 30 formed at a central area 48 of the bath. Vortex 30 is at the central axis of cylindrical bath 12 in the apparatus shown. Liquid flow and the resulting vortex formation is not essential to practicing the inventive process generally, provided that the feed rate of polymer and fiber is suitably controlled along with the viscosity and structural integrity of film 38. In many cases, however, it is preferable to have a vortex since this will impart radial and tangential forces to the film in order to help adhere film 38 to a fiber 32 that is to be coated. The shape and dimension of the vortex may be readily adjusted by altering flow rates and the geometry of the system. The liquid used for forming the bath is typically, but not necessarily water, and may or may not be partially miscible with the polymer solution. Since pre-cast films are generally preferred it is usually required that the bath liquid be immiscible with the polymer solution; as is the case with the illustrative example described hereinafter. The cast film should generally contain residual solvent when it contacts the fiber to promote adhesion. Excess solvent can be evaporated later to obtain a polymer coating of predetermined thickness.

Before film 38 reaches central vortex 30, typically, fiber 32 is fed through inlet 16 and out through hole 18 at the desired linear feed rate. Fiber 32 may be any suitable fiber such as a polyolefin or substituted polyolefin such as poly (acronitrile) or a polyamide, polyimide, polycarbonate, polyester, polysulfone, polyether ketone, or mixtures or composites thereof and may be of a diameter to minimize leakage through hole 18 if so desired. Generally, fiber 32 is fed at a linear rate of from about 0.5 to about 100 cm/sec with a speed of about 10 cm/sec being typical. Fibers of any diameter may be used, 500 microns being typical with the feed rates of polymer solution recited above; to produce uniform coatings of from about 100 angstroms to 5 microns in thickness.

To coat fiber 32, polymer is continuously fed so that film 38 reaches vortex 30 as fiber 32 is fed therethrough. Film 38 contacts the fiber 32 at 30 and adheres thereto to produce a coated fiber 35 as schematically depicted. During this process, nitrogen is circulated as indicated by arrows 42, and 44 through an inlet 24 and out an exit 26. The atmosphere may be re-circulated or enriched with solvent vapor if necessary to maintain a significant partial pressure of solvent above the bath so that the film does not become too stiff.

After exiting outlet 18 and proceeding to area 52, the fiber is dried if necessary and may be re-coated by conveniently switching the take-up and feed rolls if multiple coatings are desired in accordance with the present invention either very thin coatings can be prepared, or if so desired, thicker films may be applied, for example, multiple coatings of cladding layers of different refractive index may be used on a core material to produce a graded optical fiber. Especially preferred embodiments of the present invention are those in which substantially all of the polymer film cast on the bath is applied to the fiber in a continuous process or a steady state is otherwise achieved. In such cases, the thickness of the film may be readily predicted by the way of a mass balance so that the desired thickness can be achieved.

While the film is forming on the bath and being radially advanced on the water to the central region 48, the solvent partially evaporates into the nitrogen atmosphere of interior chamber 17. Inasmuch as the linear speed and/or thickness of polymeric film layer 38 must change as the film forms, spreads and is conveyed to fiber 16, it is important not to evaporate too much solvent or the film will harden and continuous operation leading to a useful product cannot be achieved. Polymeric layer 38 should thus be maintained in a low viscosity state throughout the process as compared to an unswollen polymer which is termed a sufficiently low viscosity herein. If the amount of evaporation is too high the film will not maintain sufficiently low viscosity on a cylindrical bath and the coating will come to a standstill since the film is too brittle. On the other hand, if the film solution 38 is too dilute when it contacts the fiber, the film may wick into the pores of the fiber or not have enough structural integrity to act a pre-cast film as is desired.

Preferably, the solvent is partially evaporated from the polymer solution during processing as in the nitrogen atmosphere of the plenum shown in FIG. 1. This can be acheived by either controling the $N_2$ flow or by use of a solvent mixture of a high and low boiling solvent. The polymeric layer is radially advanced from all directions equally to central region 48 so that coatings of uniform thickness are achieved about the entire circumference of coated fiber 35.

In preferred embodiments, the bath is drained at a central coating point so that the polymeric layer is radially transported to a circumferential vortex defined about the fiber and a uniform, tightly adhered coating is achieved. If insufficient solvent is present at the coating region, adhesion may suffer.

To achieve coatings of uniform thickness about the entire periphery of the fiber it will be appreciated that radially advancing the film 38 refers to the fact that the polymer film is approaching fiber 32 from all directions about 360 degrees in the plane of the bath equally, that is, the mass flux is constant about 360 degrees from the fiber as the central point of a circle or in other words, that there is a substantially constant mass flux rate inwardly about coating region 30 at any given radial direction. If there is insufficient solvent remaining in film 38 as it approaches the coating area, it has been found that it is not possible to maintain a constant mass flow rate. In order to control and optimize the coating process it has been found most useful to use a flourescent dye such as a substituted cumarin in low concentrations and observe the coating process under UV light.

The inventive system is in many respects self-stabilizing in the sense that the system will tend to correct itself to the desired characteristics; for example, if the vortex and inward flow of the bath is not optimal for a particular system because liquid flow of the bath is too low, the amount of polymer deposited on the fiber will still be as desired because the polymer solution will distribute itself properly because of gravity and flow inwardly as the inner portions of film 38 are removed by the moving fiber provided the viscosity is proper.

The present invention is further illustrated in connection with the following example.

Illustrative Example

A polymer solution was prepared containing 2.5 wt. per cent of a polyimide which was the condensation product of 2,2 bis(4-aminophenyl) hexafluoropropane and 2,2 bis(3,4-dicarboxyphenyl) hexafluoropropane-dianhydride (as described in copending application U.S. Pat. application Ser. No. 462,272 filed Dec. 21, 1989 and published as European Application Publication No. 0355 367 on Feb. 28, 1990 the disclosure of which is incorporated herein by reference) in a 50/50 mixture of 1,2,3-trichloropropane and butyl acetate as the solvent, and $3 \times 10^{-2}$ weight per cent of Perenol 54 a surface active agent manufactured by Henkel Corp., Amblers, Pennsylvania, which is a polysiloxane type of surface active compound, as a processing aid.

In order to coat the fiber, the solution as prepared above and represented by arrows 34 was added to surface 36 of the bath as shown at constant rate of 1 microliter per second by way of a syringe type feeder while simultaneously, fiber 32, a hollow microporous polypropylene fiber was drawn through the polymeric film layer 38 at a rate of 10 cm/sec as shown by arrow 40 and nitrogen is circulated as shown by arrows 42 and 44. The microporous fiber employed is marketed by Hoechst-Celanese Corporation, 86 Morris Avenue, Summit, New Jersey 07901 under the trademark and designation Celgard ® 2400. This fiber has a diameter of about 500 microns and an effective average pore size of about 0.02 microns.

As part of the process, water was gently added to the bath at 20 and withdrawn at 46 and 28 so that centrally located vortex 30 is created as the film is transported to the fiber. The rate of addition of polymer, water circulation and fiber speed are carefully adjusted so that the film is uniform about the circumference of coated fiber 35 and all of the polymer in the film is applied to the fiber.

One of the many advantages of the present invention is that the uniform coating thickness can be readily adjusted in steady-state cases where all of the polymer is applied to the fiber since the coating thickness can be easily calculated by way of a steady- state mass balance. After a film is applied to a cylindrical fiber and the solvent is fully evaporated, the coating thickness is determined according the relationship:

$$x = \frac{v\,c\,\rho_{sol}}{\rho_p\,\pi\,d_f L}$$

where
x = coating thickness
vv = volumetric feed rate of polymer solution, $dVol./d_t$
c = concentration of polymer in solution (weight/weight)
$\rho_p$ = polymer density
$\rho_{sol}$ = solution density
$d_f$ = fiber diameter
L = linear feed rate of fiber; $dLength/d_t$ Thus given $\rho_p = \rho_{sol}$, a feed rate of fiber of 10 cm/sec, a fiber diameter of 500 microns and a volumetric feed rate of 1.5 microliters per second of a polymer solution containing 2.5% weight per cent polymer, a uniform coating thickness of 2400 Angstroms will be achieved.

While the invention has been described in detail hereinabove various modifications will be apparent to those of skill in the art. For example, rather than having substantially all of the polymer deposited on the fiber to be coated, a predetermined fraction could be removed by way of an annular separator and steady state operation still may be possible. Such modifications are within the spirit and scope of the present invention which is limited and defined only by the appended claims.

What is claimed is:

1. A method of coating a fiber with a thin layer of polymer to form a coating thereon comprising the steps of:
   (a) providing a fluid bath capable of receiving on its surface a polymer solution;
   (b) applying a polymer solution to the surface of said bath, said solution and said bath cooperating such that said solution forms a polymeric film layer on the surface of said bath;
   (c) radially advancing the polymeric film layer to a coating region of the bath;
   (d) drawing a fiber through said polymeric film layer at the coating region of said fluid bath;
   (e) maintaining said polymeric film layer at a sufficiently low viscosity so that it retains a substantially uniform flux rate about the periphery of said coating region;
   wherein said fiber is drawn through said polymeric film layer at the coating region at a predetermined rate so that the polymeric film layer cooperates with the fiber to deposit a film of substantially uniform thickness adhered about the entire circumference of the fiber.

2. The method according to claim 1, wherein the rate of depositing said film on said fiber is substantially the same as the rate the polymer is supplied to said coating region of said fluid bath so that substantially all of the polymer supplied to said fluid bath is deposited on the fiber.

3. The method according to claim 1, wherein said polymer solution and said bath are immiscible.

4. The method as defined in claim 1 wherein the thickness of said polymer coat, X is defined in accordance wth the formula:

$$x = \frac{v\,c\,\rho_{sol}}{\rho_p\,\pi\,d_f L}$$

where, in step (a) of claim 1, v-volumetric feed rate of said polymer solution, C is the concentration of the polymer in said polymer solution, $\rho_p$ is the polymer density of said polymer and $\rho_{sol}$ is the density of said polymer solution; and where, in step(c) of claim 1, df is the fiber diameter and L is the linear feed rate of the fiber.

5. The method according to claim 1, wherein the polymer solution is continuously provided to the surface of the bath.

6. The method according to claim 1, wherein the fiber is a microporous fiber.

7. The method according to claim 6, where the film adhered to the fiber has a thickness of about 100 angstroms to about 5 microns in thickness.

8. The method according to claim 1, wherein said polymer solution comprises a polyimide, polycarbonate, polyester, polyamide, polyolefin or mixtures thereof.

9. The method according to claim 8, wherein the polymer in the solution includes a hexafluoroisopropylidene moiety.

10. The method according to claim 1, wherein the fiber comprises a polyolefin, substituted polyolefins including poly(acrylonitrile), polyimide, polycarbonate, polyester, polyamide, polysulfone or polyetherketone polymers or mixtures thereof.

11. The method according to claim -1, wherein said polymer solution is supplied to the fluid bath surface in a concentration of from about 0.1 to about 30 weight per cent polymer.

12. The method according to claim 11, wherein the solution supplied to the bath surface is about 1 to about 10 weight per cent polymer.

13. The method according to claim 1, wherein said polymer solution contains a surface active agent.

14. The method according to claim 13, where said surface active agent is selected from the group consisting of anionic, cationic, polyoxyethylene, semipolar or zwitterionic surfactants or mixtures thereof.

15. The method according to claim 14 wherein said surfactant is a polysiloxane surfactant or has a perfluorinated hydrophobic portion.

16. The method according to claim 1, wherein the fiber is drawn through the coating region at a speed of from about 0.5 to about 100 cm/sec.

17. The method according to claim 1, wherein the polymer solution is supplied to the bath at a rate of about 0.5 to about 20 microliters per second.

18. The method according to claim 17, wherein the polymer solution is supplied to the bath at a rate of about 0.5 to about 3 microliters per second.

19. A method of continuously coating a fiber with a thin layer of polymer to form a substantially defect-free uniform coating thereon comprising the steps of:
  (a) providing a water bath capable of receiving on its surface a polymer solution;
  (b) applying a polymer solution to the surface of said water bath, said solution and said bath cooperating such that said solution forms a polymeric film layer on the surface of said bath;
  (c) draining said water bath about a central drain region to define a circumferential vortex and radially advancing said polymeric film layer thereto;
  (d) drawing a fiber through said vortex region at a suitable speed;
  (e) maintaining said polymer solution at a sufficiently low viscosity so that it retains a substantially uniform flux rate about the periphery of said vortex;
  wherein said fiber is drawn through the vortex region at a predetermined rate so that the polymeric film layer cooperates with the vortex ad fiber to deposit a uniform film adhered about the circumference of the fiber.

20. An apparatus for continuously coating a fiber with a thin layer of polymer to form a substantially defect-free uniform coating thereon comprising a bath, means for providing a polymer solution to the surface of said bath, drain means positioned, configured and dimensioned to cooperate with the bath to create a vortex region, means for providing a fiber to said vortex region, and means for maintaining said polymer solution at a relatively low viscosity so that when said fiber is drawn through the vortex region at a predetermined rate a uniform polymer layer is adhered about the circumference of the fiber.

21. The method according to claim 1, wherein said fluid bath is water.

* * * * *